United States Patent
Blinn et al.

(10) Patent No.: US 7,155,411 B1
(45) Date of Patent: Dec. 26, 2006

(54) INTEGRATING PAYMENT ACCOUNTS AND AN ELECTRONIC WALLET

(75) Inventors: Arnold N. Blinn, Clyde Hill, WA (US); Joseph N. Coco, Redmond, WA (US); Greg A. Marks, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1023 days.

(21) Appl. No.: 09/675,466

(22) Filed: Sep. 28, 2000

(51) Int. Cl.
*G06F 17/60* (2006.01)

(52) U.S. Cl. .............................. 705/40; 705/1; 705/41; 705/14

(58) Field of Classification Search .................. 705/40, 705/41, 1, 14
See application file for complete search history.

(56) References Cited

U.S. PATENT DOCUMENTS

| | | | |
|---|---|---|---|
| 5,221,838 A * | 6/1993 | Gutman et al. ............. | 235/379 |
| 5,590,038 A * | 12/1996 | Pitroda ........................ | 705/41 |
| 5,710,886 A * | 1/1998 | Christensen et al. .......... | 705/14 |
| 5,883,810 A | 3/1999 | Franklin et al. | |
| 5,889,863 A * | 3/1999 | Weber ........................ | 705/76 |
| 6,125,352 A * | 9/2000 | Franklin et al. ............. | 705/26 |
| 6,490,602 B1 * | 12/2002 | Kraemer ..................... | 715/513 |
| 6,636,833 B1 * | 10/2003 | Flitcroft et al. ................ | 705/1 |

* cited by examiner

*Primary Examiner*—Vincent Millin
*Assistant Examiner*—Daniel Felten
(74) *Attorney, Agent, or Firm*—Lee & Hayes, PLLC (57) ABSTRACT

An electronic wallet including is made available to a user and is capable of storing a wide variety of different types of accounts (including both payment accounts and traditional credit card accounts). An identification of the different accounts corresponding to a user is displayed to the user and the user is allowed to manipulate these accounts. The electronic wallet also allows the user to combine funds from multiple different accounts into a single account. This combination allows the interface on a merchant server to be designed to accommodate a single account without concern for what types of accounts a user may wish to combine. Furthermore, in accordance with one aspect, when the user is purchasing goods and/or services from a merchant online, only those accounts that are useable at the merchant are presented as being available to the user.

33 Claims, 9 Drawing Sheets

INTEGRATING PAYMENT ACCOUNTS AND AN ELECTRONIC WALLET

TECHNICAL FIELD

This invention relates to electronic commerce, and more particularly to integrating payment accounts and an electronic wallet.

BACKGROUND OF THE INVENTION

As computer systems throughout the world are becoming increasingly connected via the Internet, the uses for the Internet are similarly expanding. One rapidly growing use of the Internet is for electronic commerce, where merchants make goods and/or services available for purchase "on-line" via the Internet. Such purchases may be delivered via the Internet (e.g., software downloaded from the merchant to the purchaser's computer) or alternatively delivered via more traditional in-person routes (e.g., mailing a product using the postal service).

Although the types and sources of goods and/or services available for purchase on-line have increased, difficulties have been encountered in providing a way for users to pay for these purchases. Many on-line merchants allow a user to establish an account at a merchant's server computer and enter various user-specific information (such as name, credit card number, credit card billing address, shipping address, telephone number to contact in case of problems, etc.). Unfortunately, this requires the user to enter such information repeatedly—at least once for each merchant he or she is using. Additionally, some merchants make the process of changing the user-specific information cumbersome, forcing a user that uses multiple different credit cards to re-enter information each time a different credit card is used.

In addition to standard credit cards, users can now purchase goods online using a plethora of new payment accounts. These new payment accounts include standard bank debit cards, electronic gift certificates, reward accounts, rebate accounts, teen cards, and various other types of accounts. These payment accounts are often "virtual", meaning that no physical card is issued to the consumer. Purchasing with an account like this means that the user needs to write down the appropriate information for the payment account, such as account number and expiration date so that s/he can enter it at the time of checkout at the merchant site. The piece of paper this information is recorded on is often misplaced by the user and is therefore not available at the time of purchase.

Many of these new payment accounts are based on traditional credit cards (e.g. Visa®, MasterCard®, American Express®, Discover®) with a different marketing wrapper or veneer. So, the "XYZ" Internet portal may offer users a rewards account that is similar to a Visa® card, but with the Visa®) branding either removed completely or only subtly displayed (and a credit associated therewith). The advantage of using the existing credit card settlement network is that merchants do not have to do any work (or little work) to accept these new payment accounts on their web site. The downside is that the user may be expecting to see on the merchant site a payment choice called "XYZ Reward Account" but instead only sees Visa®, MasterCard, and American Express as available options. It is often not readily apparent to the consumer that s/he needs to enter the reward account information into the merchant site as a Visa® card.

Yet another issue with these new payment accounts is that the available balance in the account is usually quite a bit less than the credit that is available on a traditional credit card. For instance, an electronic gift certificate may have a balance of $20. This low balance greatly increases the probability that the user will attempt to purchase an item whose total cost exceeds the amount in the account. Unfortunately the user may not realize this until after the merchant denies the purchase due to insufficient funds. Additionally, merchants are often unable to accept multiple payment mechanisms for a single purchase, as the user interface to do this is difficult and usually confusing to the end-user, especially when different merchants implement this in different ways.

The invention described below addresses these disadvantages, providing integration of payment accounts and an electronic wallet.

SUMMARY OF THE INVENTION

Integrating payment accounts and an electronic wallet is described herein.

In accordance with one aspect, an electronic wallet is made available to a user and is capable of storing a wide variety of different types of payment accounts. An identification of a user's payment accounts is displayed to the user and he or she is allowed to manipulate these accounts (for example, add new accounts, change information in accounts, delete accounts, add funds to accounts, transfer funds between accounts, etc.). The information for a payment account need only be input once by the user, yet can be used to make purchases at a wide variety of different merchants.

According to another aspect, a wallet server that stores an electronic wallet can combine funds from multiple different accounts into a single account. This combination allows the interface on a merchant server to be designed to accommodate a single account without concern for what types of accounts a user may wish to combine. Rather, the combination is handled by the wallet server, which manages the transfer of funds from an additional account into an original account, and then forwards the account number (and any other necessary information) for the original account to the merchant.

According to another aspect, when the user is purchasing goods and/or services from a merchant on-line, only those accounts that are useable at the merchant are presented as being available to the user. The user can then select one of the presented accounts in his or her electronic wallet to use as the source of funds for the purchase. Given the large number of different account types, it is possible that the merchant will not explicitly accept every one. But the merchant may accept traditional credit card types to which the payment accounts map. In this case, the electronic wallet automatically determines which payment accounts the merchant can accept based on their underlying card type, thereby making the payment account available to the consumer for payment. Conversely, if a merchant does not accept a particular type of credit card, then the user's payment account that corresponds to that type of credit card is not displayed to the user even though it is in his or her electronic wallet.

According to another aspect, the payment accounts of one type are converted to another type by a wallet server. This conversion is performed transparent to both the user and the merchant, allowing the user to believe he or she is using one type of account while the merchant believes he or she is using another type of account. Such transparent conversion allows payment accounts to be displayed to the user in a more user-friendly manner and yet reduce the amount of integration required by the merchant.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
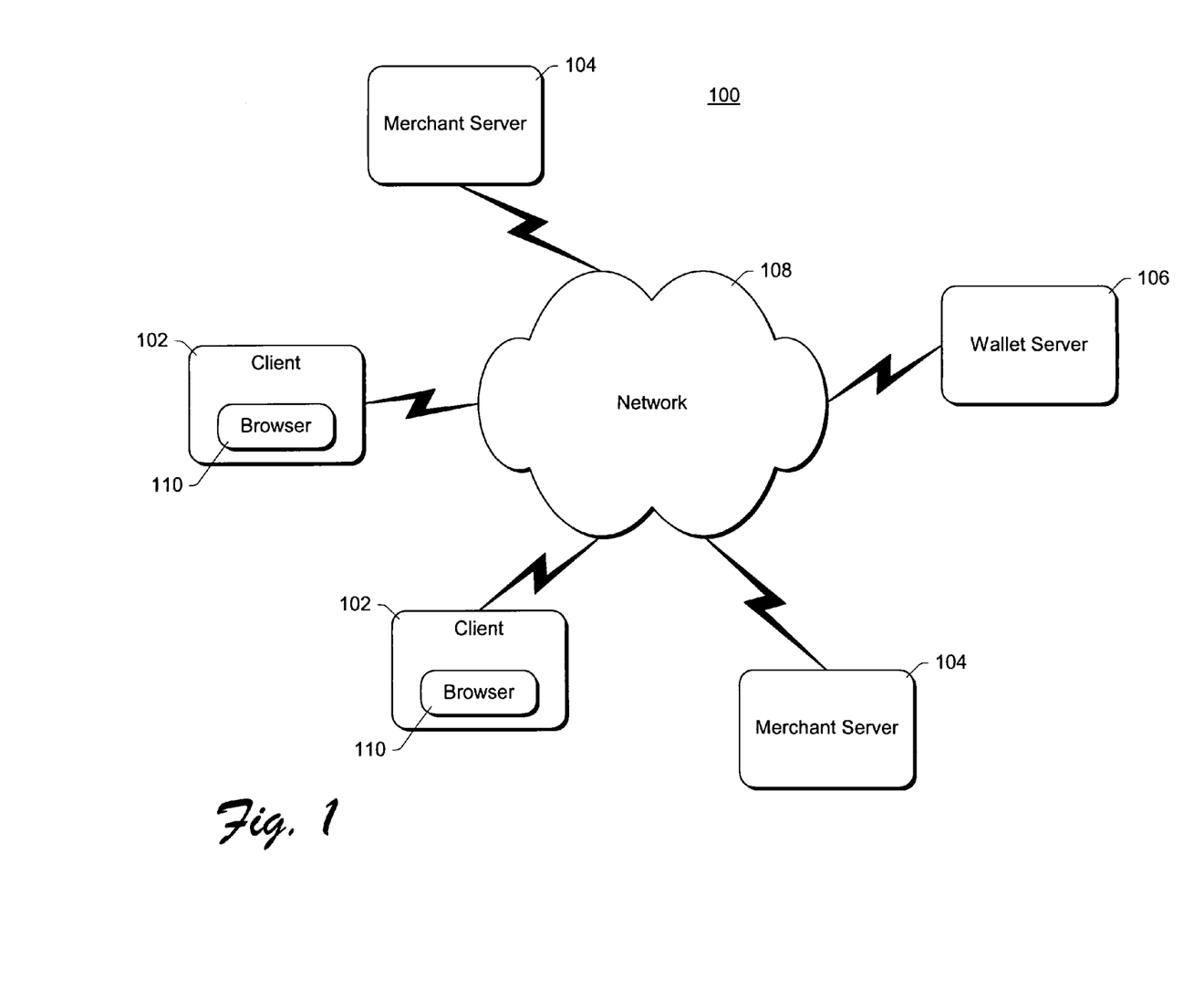
FIG. 1 is a block diagram illustrating an exemplary network environment such as may be used in accordance with certain embodiments of the invention.

FIG. 1 is a block diagram illustrating an exemplary network environment such as may be used in accordance with certain embodiments of the invention. In the network environment 100 of FIG. 1, multiple clients 102, multiple merchant servers 104, and a wallet server 106 are illustrated coupled together via a network 108. Network 108 represents any of a wide variety of wired and/or wireless networks, including public and/or private networks (such as the Internet, local area networks (LANs), wide area networks (WANs), etc.). Clients 102 and servers 104, 106 can be coupled to network 108 in any of a wide variety of conventional manners, such as wired or wireless modems, direct network connections, etc.

Clients 102 communicate with servers 104, 106 using one or more conventional protocols. In one implementation, network 108 is the Internet which supports the World Wide Web. The World Wide Web (also referred to as simply the "Web") is a collection of documents (referred to as "Web pages") that users can view or otherwise render and which typically include links to one or more other pages that the user can access. Information is communicated among clients 102 and servers 104 using, for example, the Hypertext Transfer Protocol (HTTP), although other protocols (either public or proprietary) could alternatively be used. Web pages are created in a markup language, such as the Hypertext Markup Language (HTML) or the extensible Markup Language (XML), although other languages could alternatively be used.

Wallet server 106 maintains an electronic "wallet" for each of multiple users of clients 102. Inside his or her electronic wallet, a user is able to store information regarding various accounts, some of which are traditional credit card accounts and others of which are referred to as "payment accounts". As used herein, a "payment account" refers to an account that has a monetary value associated with it (which may be changed), rather than a line of credit as is associated with traditional credit card accounts. The user is able, via a Web browser 110 running on a client 102, to use the payment accounts to make purchases on-line and also to manipulate the payment accounts. Such manipulation includes, for example, setting up new payment accounts, changing information in previously created payment accounts, adding funds to payment accounts, transferring value between payment accounts, etc.

During operation, Web browser 110 accesses a Web page hosted by a merchant server 104. A user is able, via Web browser 110, to purchase goods and/or services from the merchant via the Web page hosted by the merchant server 104. During the purchasing process, Web browser 110 receives, from wallet server 106, an indication of the accounts (including payment accounts and traditional credit card accounts) available to the user. Web browser 110 allows the user to select one of these available accounts to purchase the goods and/or services, and forwards payment information for the account to the merchant server 104.

Figure 2:
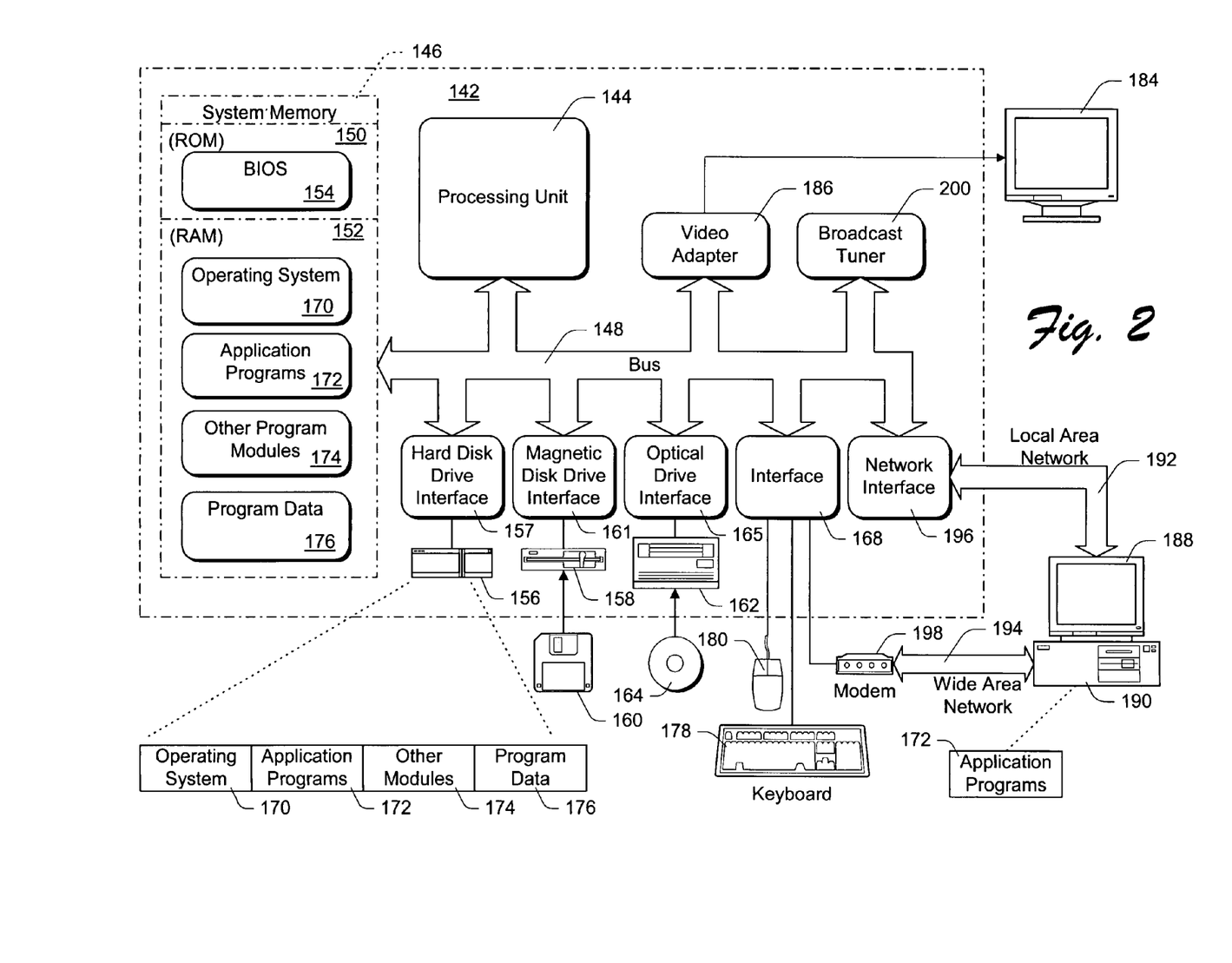
FIG. 2 illustrates an example of a suitable operating environment in which at least portions of the invention may be implemented.

FIG. 2 illustrates an example of a suitable operating environment in which at least portions of the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, handheld or laptop devices, multiprocessor systems, microprocessor-based systems, programmable consumer electronics, gaming consoles, cellular telephones, public terminals or kiosks, wearable computers, network PCs, minicomputers, mainframe computers, distributed computing environments that include any of the above systems or devices, and the like.

Alternatively, the invention may be implemented in hardware or a combination of hardware, software, and/or firmware. For example, one or more application specific integrated circuits (ASICs) could be designed or programmed to carry out the invention.

FIG. 2 shows a general example of a computer 142 that can be used in accordance with the invention. Computer 142 is shown as an example of a computer that can perform the functions of a client 102 or server 104 or 106 of FIG. 1. Computer 142 includes one or more processors or processing units 144, a system memory 146, and a bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory 146 includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk drive interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from and/or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 that is coupled to the system bus (e.g., a serial port interface, a parallel port interface, a universal serial bus (USB) interface, etc.). A monitor 184 or other type of display device is also connected to the system bus 148 via an interface, such as a video adapter 186. In addition to the monitor, personal computers typically include other peripheral output devices (not shown) such as speakers and printers.

Computer 142 operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In certain embodiments of the invention, computer 142 executes an Internet Web browser program (which may optionally be integrated into the operating system 170) such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Computer 142 also includes a broadcast tuner 200. Broadcast tuner 200 receives broadcast signals either directly (e.g., analog or digital cable transmissions fed directly into tuner 200) or via a reception device (e.g., via antenna 110 or satellite dish 114 of FIG. 1).

Computer 142 typically includes at least some form of computer readable media. Computer readable media can be any available media that can be accessed by computer 142. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 142. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
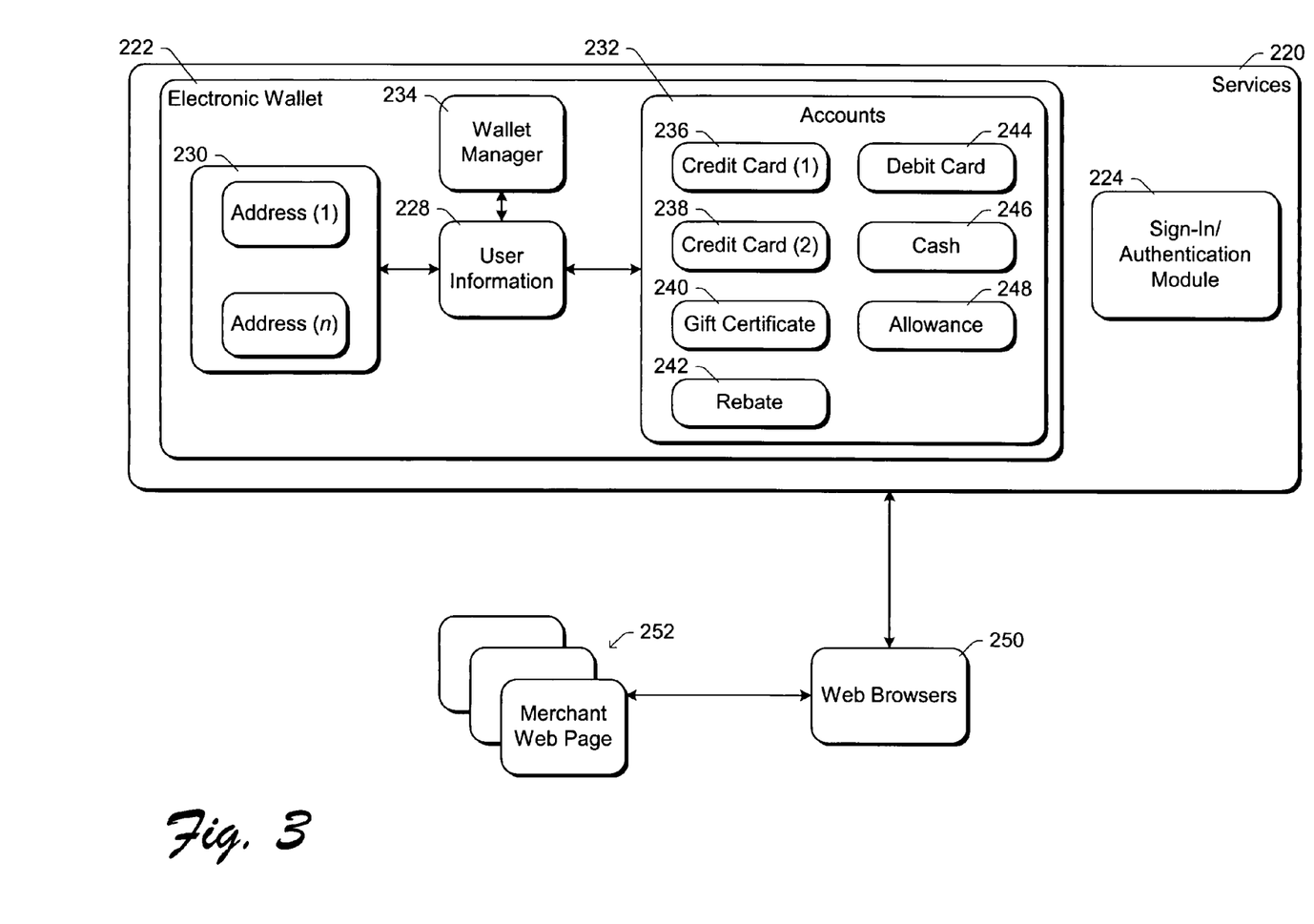
FIG. 3 illustrates an exemplary suite of services including an electronic wallet such as may be used in certain embodiments of the invention.

FIG. 3 illustrates an exemplary suite of services including an electronic wallet such as may be used in certain embodiments of the invention. The suite of services 220 includes an electronic wallet 222 and an authentication module 224. The suite of services 220 may be made available to users from the same remote server (such as server 106 of FIG. 1) or alternatively different servers (for example, electronic wallet 222 may be made available from the first server while authentication module 224 is made available from another server).

In the illustrated example, a user first signs in or logs in to services 220 using his or her Web browser. This sign-in may be accomplished directly by the user accessing a Web page hosted by the server that provides services 220, or alternatively indirectly by the user accessing another Web page that redirects the user's Web browser to services 220. Sign-in is managed by authentication module 224, which verifies the identity of the user signing in. This verification can be performed in any of a wide variety of conventional manners, such as using a user ID and associated password, as well as any of numerous cryptographic and other techniques for authenticating the user. Once the user's identity is verified, the user is able to access the information maintained by services 220.

Electronic wallet 222 stores various purchasing and address information for a user. This stored information includes user identification information 228, address information 230, and information for multiple accounts 232 (including both payment accounts and traditional credit card accounts). User identification information 228 includes various information uniquely identifying the user electronic wallet 222 belongs to as well as information about the user's electronic wallet. Table I identifies the user identification information maintained in one exemplary implementation.

TABLE I

| Name | Description |
| --- | --- |
| MemberId | The user ID. |
| ProfileVersion | An incremental counter starting at 1 and incremented each time the electronic wallet is updated/modified. |
| CurrentAddress | The AddressID of one of the user's addresses. Often used as the default shipping address for purchased goods and/or services. |
| CurrentCard | The ID of one of the user's accounts, which can be a payment account or traditional credit card account. |

Address information 230 includes various addresses corresponding to the user. These addresses can include, for example, a home address, a business address, shipping addresses for the user or others (e.g., friends or family), a credit card billing address, etc. Table II identifies the information maintained for each address in one exemplary implementation.

TABLE II

| Name | Description |
| --- | --- |
| AddressID | Unique (for the user) identifier of the address. |
| MemberId | The user ID |
| Fname | First name of person for address. |
| Lname | Last name of person for address. |
| Addr1 | First line of address (e.g., to include company or street name). |
| Addr2 | Second line of address (e.g., to include street name or apartment number). |
| City | City for address. |
| State | State for address. |
| PostalCode | Postal code for address. |
| Country | Country for address. |
| Phone | Phone number corresponding to address. |
| Email | Email corresponding to address (could be the user, the person identified in Fname and Lname fields, or someone else). |
| FriendlyName | User-friendly identifier of the address (e.g., "Home", "Mom's Address", etc.). |

Multiple accounts 232 are illustrated with the electronic wallet 222. In the illustrated example, two credit cards 236, 238, a gift certificate 240, a rebate account 242, a debit card 244, a cash account 246, an allowance account 248, and a reward account 249 are shown. It is to be appreciated that these accounts illustrated are exemplary only, and alternatively more or fewer accounts could be included in electronic wallet 222. Additionally, other types of accounts (not shown), such as Micro Payment accounts, may also be included in electronic wallet 222. Credit card accounts are accounts that correspond to the user's physical credit cards. Gift certificate payment accounts are accounts that correspond to electronic gift certificates that have been given (or otherwise transferred) to the user. Rebate payment accounts are accounts that correspond to electronic rebates that have been given (or otherwise transferred) to the user, such as in response to the user's purchase of a particular product. Reward payment accounts are accounts that correspond to rewards that have been given to the user in exchange for certain behavior (e.g., accessing certain web sites, making donations, being a long-term customer, registering a product within a certain period of time, etc.). Debit card payment accounts are accounts that correspond to the user's physical debit cards (e.g., as issued by a bank). Cash payment accounts are accounts that are analogous to physical cash carried by the user. Cash payment accounts are similar to debit card payment accounts in that they have a limited amount of funds associated with them and do not involve issuance of credit to the user. Allowance payment accounts are a special type of cash or debit payment account that are designed to be given to children.

Different types of accounts (e.g., credit cards, debit cards, gift certificates, rebates, rewards, cash, allowance, etc.) can be included in electronic wallet 222, as well as multiple accounts of the same type. Each of the different types of accounts is presented differently to the user, allowing him or her to easily distinguish between accounts. In some instances, logos corresponding to the account type (e.g., Visa®) or the issuer (e.g., the bank name) may be displayed to the user. However, even though the different account types are presented to the user differently, the different account types may share an underlying format. For example, gift certificates may use the same account numbering scheme as is used for Visa® cards.

Each of the accounts 232 includes payment information for the account. This payment information includes information that is passed to a merchant server to allow the user to purchase goods and/or services from a merchant. Table III identifies the information maintained for each account 232 in one exemplary implementation. Note, however, that not all accounts need include all of this information, and other accounts may include additional information.

TABLE III

| Name | Description |
| --- | --- |
| ID | Unique (for the user) identifier of the account. |
| MemberId | The user ID. |
| Type | An identifier of the type of account. |
| Num | An account number for the account. For credit cards, the credit card number. |
| Num2 | A secondary number for identifying the card. For Visa cards this could be the CVV2 (Card Verification Value 2). |
| Exp | An expiration date of the account. |
| BillingAddress | The AddressID of one of the address in the Addresses table. |
| Name | The name on the account. |
| FriendlyName | A user-friendly identifier of the account (e.g., "Joe's Visa", "Gift Certificate From Mom", "Rebate from Microsoft ®"). |

Services 220 can be accessed by client Web browsers 250 for a variety of different purposes. A user may access services 220 directly, such as to modify information in electronic wallet 222 (e.g., add a new payment account, change an address, etc.). A wallet manager 234 transmits web pages to browser 250 with options allowing a user to add, delete, and modify accounts 232 and addresses 230. A user may also access services 220 indirectly, such as when making a purchase of goods or services from a merchant Web page 252. During the purchasing process, Web browser 250 acts as an intermediary between the merchant Web page 252 and electronic wallet 222, as discussed in more detail below.

The establishment of payment accounts allows the user's spending to be limited. By way of example, parents may set up gift certificate or allowance payment accounts for their children. The child is thus able to shop and purchase goods and/or services on-line, but is limited in how much they can spend by the amount of money established in the gift certificate or allowance payment account.

Electronic wallet 222 further provides a centralized location at which a user can store all of the information necessary to make purchases on-line. The user can have multiple different types of payment accounts in his or her wallet and have them readily accessible regardless of their source. For example, the user need not remember what gift certificates and/or rebates he or she has received, but simply access his or her electronic wallet to identify the available gift certificates and rebates. Additionally, using the centralized storage of accounts 232 and addresses 1230, a user is able to simply select from already-entered data to make purchases at a wide variety of on-line merchants, thereby reducing the amount of data entry required by the user and reducing the chances of errors in entering the information at numerous locations.

In addition to using the payment accounts to purchase goods and/or services on-line, a plastic card or smart card type physical device that corresponds to the payment account may also be issued to the user to allow him or her to spend funds from the payment account in-person (e.g., at a local store, at an ATM, etc.). When using such a plastic card or smart card, the availability of funds in the corresponding payment account would be verified analogous to on-line purchases, as discussed in more detail below.

Note that certain payment accounts start with a plastic card and are entered (typically) by the user into the electronic wallet, or entered by the institution issuing the plastic. However, certain payment accounts might have their origin electronically (such as an allowance account). For these accounts, the issuing of plastic might be driven by the purchaser (e.g., for an allowance account), the recipient or owner of the account (e.g., an online cash account funded by the user), or the rules of the account itself (e.g., an online rebate program).

Figure 4:
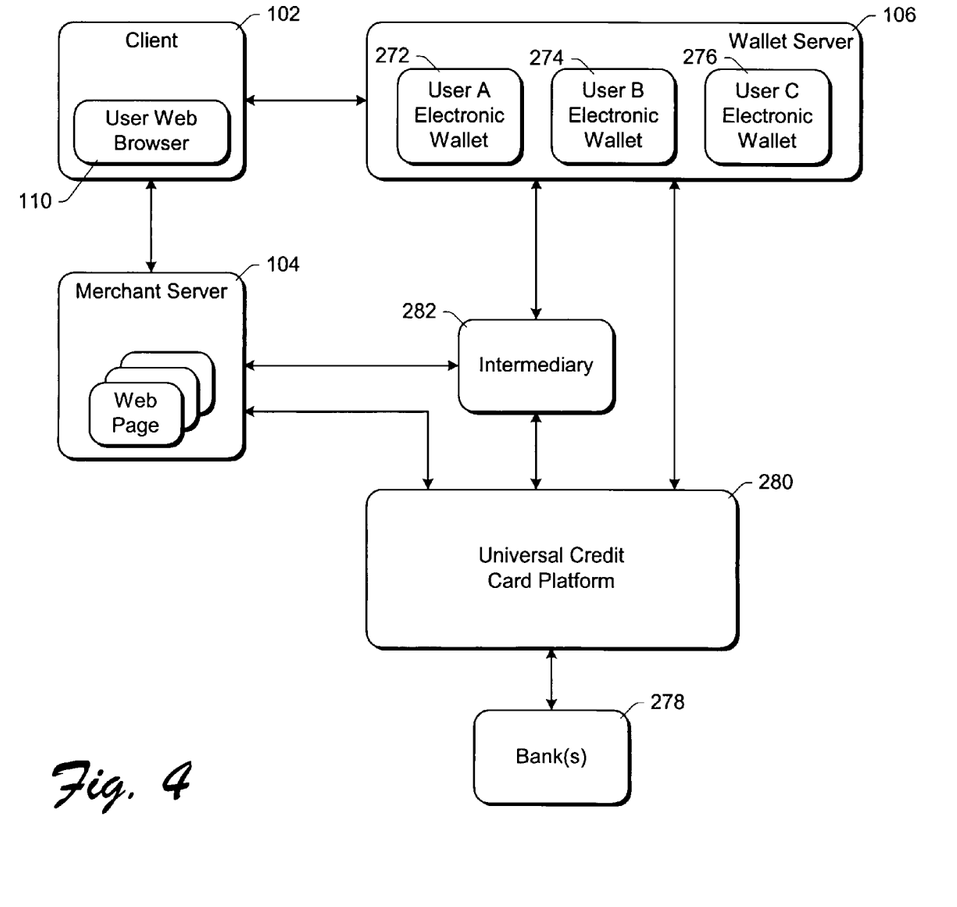
FIG. 4 is a block diagram illustrating an exemplary environment in which purchases of goods and/or services can be made using an electronic wallet.

FIG. 4 is a block diagram illustrating an exemplary environment in which purchases of goods and/or services can be made using an electronic wallet. The user of a client 102, via a Web browser 110 running on client 102, can access both a merchant server 104 and wallet server 106. Wallet server 106 includes multiple electronic wallets 272, 274, and 276, each corresponding to a different user. The user can manipulate funds in his or her wallet, and has no access to wallets of other users stored on wallet server 106.

A user can receive funds into, or spend funds from, any of the accounts identified in his or her electronic wallet. The receipt or expenditure of funds can be performed directly from wallet server 106 (e.g., a user transferring funds from one of his or her payment accounts to the payment account of another user), or indirectly from wallet server 106 (e.g., via a merchant server 104). It should be noted, however, that the payment accounts within an electronic wallet only identify accounts and money that the user has access to—the payment accounts do not actually store money themselves. For example, a debit card payment account may store a debit card number and corresponding expiration date. However, the actual money for the account (the funds that the user has access to using that debit card) is maintained by the bank (or other issuer) of the debit card.

It should also be noted that the transfer of funds between accounts is subject to the rules (if any) of the accounts. For example, funds cannot be transferred into a credit card account except when paying a bill on the credit card. By way of another example, funds should not be transferable out of an allowance payment account or gift certificate payment account unless spending at the appropriate location. By way of yet another example, funds might be restricted into a cash account for an allowance payment account (so parents know their children are not accepting cash from strangers).

When funds are being transferred from a payment account to a merchant (e.g., being spent), the identification information stored in the electronic wallet for the payment account (e.g., account number, fraud protection number (if any), expiration date (if any), and billing address (if any)) is transferred first to the merchant and then from the merchant to the issuing bank (or agent thereof) 278. This first transfer (to the merchant) can be simply done through an HTTP POST is from the wallet server to the merchant server. This second transfer (to the issuing bank) is typically performed by communicating the information to a universal credit card platform or network 280, such as that provided by First Data Corp. (FDC) of Atlanta, Ga. The universal credit card platform 280 verifies the integrity of the account number and the funds available, and reports the information to the requester (e.g., merchant server 104). Account number integrity can be verified in any of a wide variety of conventional manners. Alternatively, rather than communicating directly with the platform 280, the requester may communicate with platform 280 via an intermediary 282. Intermediary 282 may, for example, receive information for multiple purchases and combine them for submission to platform 280 as a group.

Funds can be transferred into a payment account from other accounts in the same electronic wallet, or alternatively from external sources. To receive funds into a payment account, wallet manager 234 receives an indication of the payment account the funds are to be transferred into and verifies the availability of the funds (e.g., via intermediary 282 or universal credit card platform 280), analogous to the merchant's verification of fund availability discussed above. Assuming the desired funds are available (and subject to any rules or restrictions on transfers), the wallet server adds the funds to the indicated payment account by forwarding an indication of the desired funds to the appropriate payment account issuer (e.g., via intermediary 282 or universal credit card platform 280), or by updating the appropriate indication in the electronic wallet (e.g., if the electronic wallet holds the funds). Similarly, the wallet server removes the funds from the source account by forwarding an indication of the removal (or other charge) to the appropriate source account issuer (e.g., via intermediary 282 or universal credit card platform 280).

Additionally, payment accounts can be added to an electronic wallet 222 by the user that corresponds to the wallet 222 or alternatively another user. For example, a user may desire to enter information for a new payment account, such as a new debit card he or she recently received. The user signs-in to his or her electronic wallet 222 via authentication module 224 and adds the information for the new payment account via an interface (e.g., web pages) presented by wallet manager 234.

Additionally, users may add payment accounts to other users' electronic wallets either directly or indirectly. To directly add a payment account to another user's electronic wallet (e.g., a new allowance account), the user signs in to his or her own electronic wallet, and then identifies, via wallet manager 234, the other user that the new payment account is to be added to. Such additions may be automatic, or alternatively the other user may be prompted (e.g., the next time he or she signs-in to his or her account) to approve the receipt. To indirectly add a payment account to another user's electronic wallet (e.g., a gift certificate or rebate), the user operates through an intermediary (such as an electronic mail system). The intermediary forwards an indication (e.g., an email message) to the user of the new payment account. The user can either copy information from the email message himself or herself to create the new payment account, or alternatively select a link embedded in the email message. Selection of the email message causes the source of the new payment account (e.g., a gift certificate or rebate portal) to communicate with the wallet manager 234, identifying the user that the new payment account is to be added for.

Figure 5:
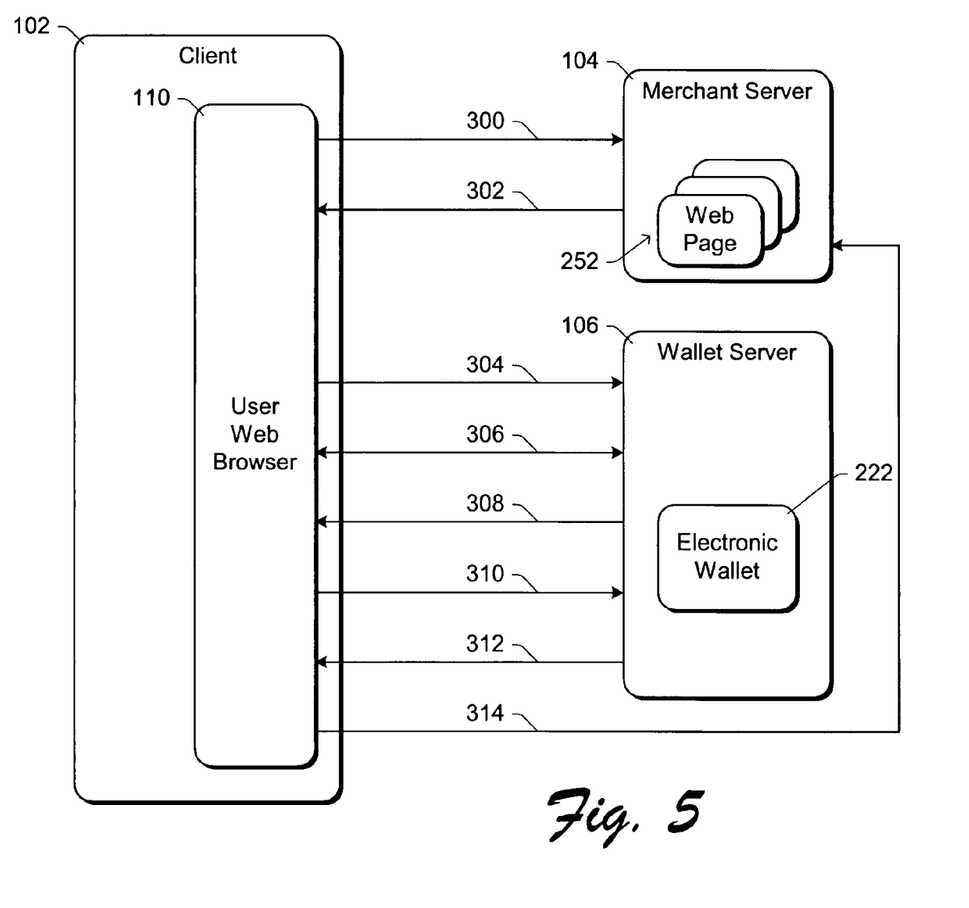
FIG. 5 is a block diagram illustrating an exemplary data flow when making a purchase from a merchant Web page using an electronic wallet in accordance with certain embodiments of the invention.

FIG. 5 is a block diagram illustrating an exemplary data flow when making a purchase from a merchant Web page using an electronic wallet in accordance with certain embodiments of the invention. A user browses or "surfs" the Internet via a browser 110 executing on a client 102. The user accesses one or more Web pages 252 at a merchant server(s) that identify goods and/or services that the user desires to purchase. The user selects these goods and/or services (act 300) in a conventional manner via browser 110. When the goods and/or services are selected, merchant server 104 displays a product purchase Web page 252 that includes a link to electronic wallet 222 (act 302). The product purchase Web page 252 typically displays the products and/or services to the user and gives him or her the option to purchase the displayed products and/or services by selecting the link to electronic wallet 222. Often times, these product purchase Web pages are referred to as "checkout" or "shopping cart" pages.

The user then selects (e.g., "clicks on") the link to the electronic wallet 222, which causes browser 110 to access wallet server 106 (act 304). Various information can be embedded in the link to the electronic wallet (e.g., included as parameters of a URL corresponding to wallet server 106). The amount of the user's desired purchase may also be embedded in the link. Table IV identifies the information embedded in the link to the electronic wallet in one exemplary implementation.

TABLE IV

| Argument | Description |
| --- | --- |
| Partner ID | An identifier of the merchant site. |
| Language Code ID | Specifies the language to display the wallet pages in. |
| Return URL | URL that the wallet server should return to after user selections are made. |
| Data Requested | Identifies what data is requested by merchant server: e.g., shipping address only, account information only (including billing address, if any), or both shipping address and account information (with billing address). Allows only appropriate options to be presented to the user on the wallet page (e.g., account information is not displayed for user selection if the merchant only requests the shipping address). |
| Cards | List of accounts that are acceptable to the merchant. |
| Preferred Card | Identifies a preferred type of account, allowing the wallet page to include a logo or other identifier of the preferred type of account (either a |

TABLE IV-continued

| Argument | Description |
| --- | --- |
| | traditional credit card account or a payment account). |
| Cobrand Parameter | Identifiers information to include, on pages displayed by wallet server 106, that identifies the merchant. |
| Countries Shipped To | Identifies the countries to which the merchant can deliver goods and/or services. |

The response by wallet server 106 varies, depending on whether the user of client 102 is already logged in to his or her wallet. If the user has not logged in to his or her wallet yet, then wallet server 106 connects browser 110 to a sign-in/authentication module (module 224 of FIG. 3). Authentication module 224 authenticates the user (act 306), associating the user of browser 110 with the correct electronic wallet 222. This allows the correct one of multiple electronic wallets stored at server 106 (that is, the electronic wallet that includes the user's information) to be associated with the user of browser 110. Once the user is logged in, a wallet page that includes the contents (or references to the contents) of the user's electronic wallet 222 can be displayed to him or her (act 308). If, on the other hand, the user is already logged in to his or her wallet, then the wallet page can be displayed to the user (act 308) without making the user repeat the sign-in process.

The wallet page displays to the user various information from his or her electronic wallet 222. This information includes, for example, different accounts 232 from which the user can select to make his or her purchases, different shipping addresses where the purchased goods are to be delivered (or purchased services to be performed), different billing addresses that correspond to different accounts 232, etc. These different options can be displayed to the user in a wide variety of different manners, such as the use of drop-down or pull-down menus, selection boxes with multiple entries (and optionally scroll bars), a radio button corresponding to each selectable option, etc. In one implementation the billing address is tied to the account, so selection of a new account automatically results in selection of the appropriate billing address.

Note that the merchant server may require different information or have different business rules with the purchase. For example, a merchant may not allow a shipping address that is different than the billing address, and indicate this to the wallet server through the "Data Requested" parameter. For this merchant then, the wallet page would not ask for the shipping address.

Additionally, the merchant might desire more information than the wallet stores. For example, the merchant might desire a gift message or delivery instructions with the purchase. Through parameters passed into the wallet server (e.g., "Data Requested" parameters), this additional information could be requested by the merchant. The wallet page would then query the user for this information (e.g., allowing the user to type the information into a particular field), and return it to the merchant.

Whatever options are selected by the user, their selection is forwarded to wallet server 106 (act 310). Based on these selections, wallet server 106 accesses electronic wallet 222 to obtain the purchase information for the selected account and address information for the purchase (e.g., shipping address and billing address for the account). This purchase information can include, for example, all necessary information to use the identified account (e.g., in the case of an account that is a credit card, the necessary information may include a billing address and credit card number). Some of this information (e.g., a credit card number) may not have been initially transferred to browser 110 (e.g., an indication of "My Visa" may have been sent in act 308, but not the actual credit card number).

Wallet server 106 transfers this purchase information and address information to browser 110 (act 312). This transfer is accomplished via an HTML GET command, with at least some of the purchase and address information (e.g., the account number and expiration date) in hidden form fields. Upon receipt, browser 110 issues an HTTPS (HTTP over SSL) POST to the merchant web page (as indicated by the ReturnURL parameter in table IV), which forwards the purchase and address information to merchant server 104 (act 314). Merchant server 104 then has the necessary information to charge the purchase to the appropriate account, allowing the merchant to be paid and the user to receive the purchased goods and/or services. In one exemplary implementation, the purchase and address information is transferred from browser 110 to merchant server 104 in accordance with the well-known Electronic Commerce Modeling Language (ECML).

Various security measures can optionally be implemented within the process illustrated in FIG. 5 to maintain the security of confidential user information. Examples of such security measures include establishing secure links between client 102 and server 104 and/or server 106 (e.g., using the HTTPS protocol), and encrypting information being passed.

In the illustrated example, wallet server 106 does not store an indication of funds in the various payment accounts of a user's electronic wallet. Rather, if such information is needed (e.g., to display to the user the funds still available to him or her from a gift certificate) then wallet server 106 communicates with the issuer of the account (e.g., via universal credit card platform 280) to obtain a current balance available in the account. Alternatively, indications of funds available in one or more payment accounts may be stored in the user's electronic wallet. For example, the value of a rebate payment account may be stored in the electronic wallet, and updated when the user spends a portion (or all) of the funds.

Wallet server 106 also allows a user to transfer funds from one account into a payment account within his or her own wallet. This transfer occurs prior to a purchase, and may be just before the purchase or alternatively a substantial period of time prior to the purchase (e.g., weeks or months). For example, a user may have a gift certificate SVA that has a value of $100. The user may realize, however, that the item he or she desires to purchase has a cost of $110. The user is able to transfer $10 from one of his or her accounts (e.g., a credit card account) to the gift certificate payment account, thereby increasing the total value of the gift certificate payment account to $110 (allowing him or her to purchase the desired item using the gift certificate payment account). In situations where an identification of funds are stored in the user's electronic wallet, then any such transfers are accomplished by updating the appropriate account balances in the electronic wallet. However, in situations where an external entity needs to be made aware of the transfer (e.g., the account issuer), then the account issuer is contacted to verify the availability of funds to be transferred (e.g., via intermediary 282 or platform 280 of FIG. 4). If sufficient funds are available, and if any restrictions on the transfer of funds are satisfied, then the appropriate charge is communicated to the issuer of the source account and the appropriate addition is communicated to the issuer of the destination account.

Wallet server 106 may also map one type of account to another type of account. This mapping allows payment accounts to maintain their original identity in the eyes of the user while at the same time allowing them to be viewed differently by a merchant. By way of example, a gift certificate may be given to a user. The gift certificate includes purchasing information in the Visa® credit card format (or alternatively in a format that can be converted to the Visa® credit card format). When the user accesses his or her wallet, he or she sees the gift certificate as a gift certificate payment account—any association that the payment account has with a Visa® card (or the Visa® card format) is hidden from the user. However, when a purchase is made, wallet server 106 communicates the purchase information for the gift certificate payment account to the merchant server as if the purchase information were from a Visa® card. Any representation of the payment account to the user as a gift certificate is thus hidden from the merchant. This has the advantage of allowing the merchant to accept the payment without doing any special work to accept a new payment account for purchase.

A user is able to maintain multiple different accounts in his or her electronic wallet, and these accounts can be of the same or different types. Not all merchants, however, may accept all of these different types of accounts. By way of example, a user may store in his or her wallet two credit card accounts (one for a Visa® card and one for an American Express® card) as well as a gift certificate payment account. Although illustrated to the user as a gift certificate, the gift certificate payment account may be of a format that can be converted to a Visa® card format. A particular merchant, on the other hand, may only accept the Visa® credit card for purchases. In this example, the wallet server would thus include on the wallet page the Visa® card and the gift certificate. The American Express® card would not be displayed because it is not useable by the user at That merchant (and cannot be converted to a useable format). Alternatively, the non-useable account(s) may be displayed to the user but displayed in a manner that indicates that it is not useable (for example, it may be presented in a different font or different color, or in a separate section identified as "not useable").

In the discussion above, various actions are described as being performed at the wallet server. For example, conversions between account formats are performed at the wallet server, purchase information for the accounts selected by the user is retrieved in response to user selections, etc. Alternatively, some or all of these actions may be carried out at the client (e.g., an applet executing in browser 110 or other application executing on the client).

Figure 6:
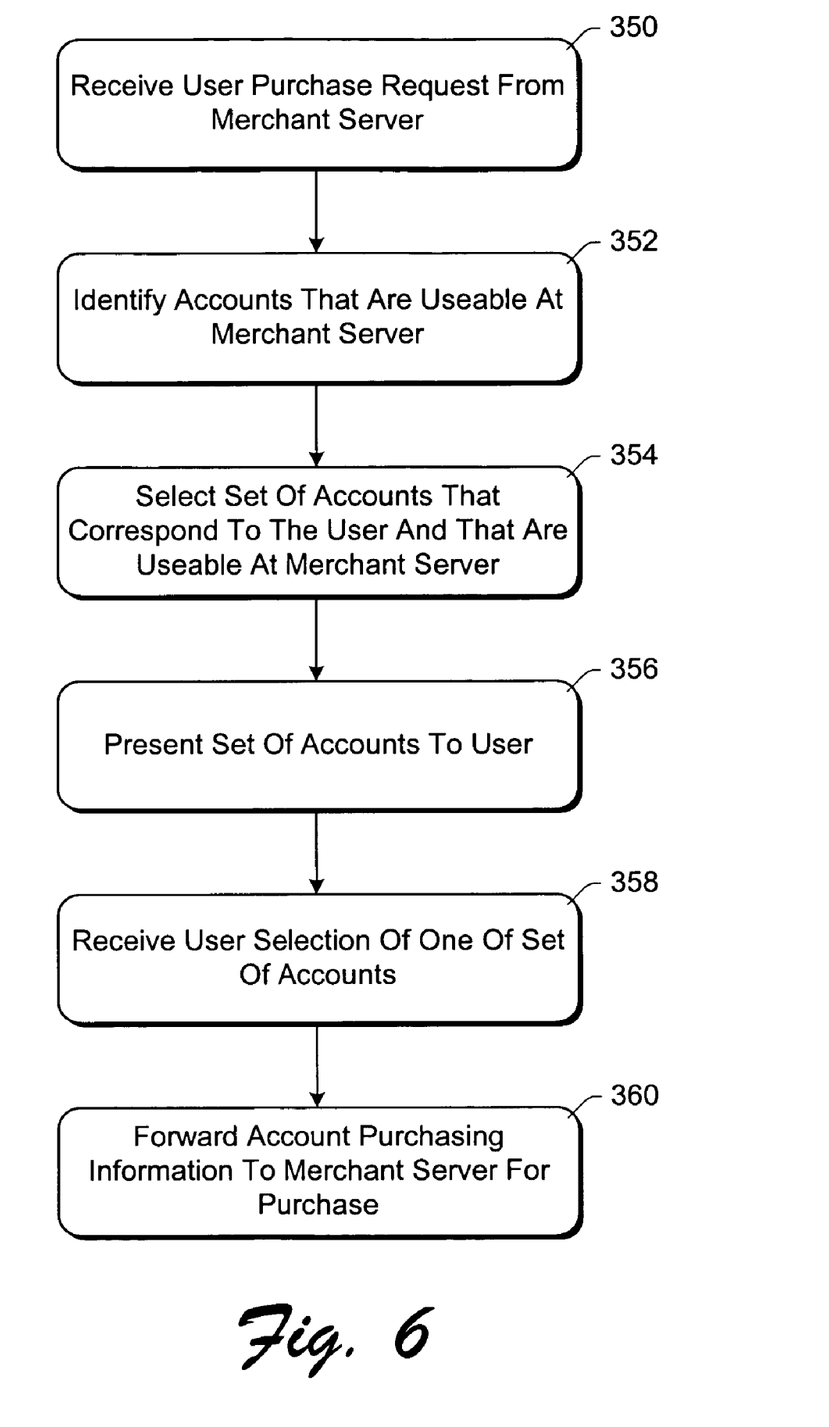
FIG. 6 is a flowchart illustrating an exemplary process for displaying accounts useable for a purchase in accordance with certain embodiments of the invention.

FIG. 6 is a flowchart illustrating an exemplary process for displaying accounts useable for a purchase in accordance with certain embodiments of the invention. The process of FIG. 6 is implemented by browser 110 and wallet server 106, and may be implemented in software.

Initially, a request for a user purchase is received from a merchant server (act 350). The accounts that are useable at that merchant are then identified (act 352). These accounts can be identified in any of a wide variety of manners (e.g., the merchant may pre-register with the wallet server with the accounts, the request received in act 350 may include them, etc.). The wallet server then selects a set of accounts corresponding to the user that are useable at the merchant server (act 354). This set includes those accounts of a type that the merchant identified as being useable, as well as those that are of a type that can be converted to a format that is compatible with any one or more of those identified as being useable by the merchant.

The set of selected accounts is then presented (e.g., displayed) to the user (act 356). The wallet server then receives a user selection of one of the accounts in the set (act 358) and forwards the account purchasing information for that account to the merchant server (act 360). This forwarding may be direct, or alternatively via a Web browser.

Figure 7:
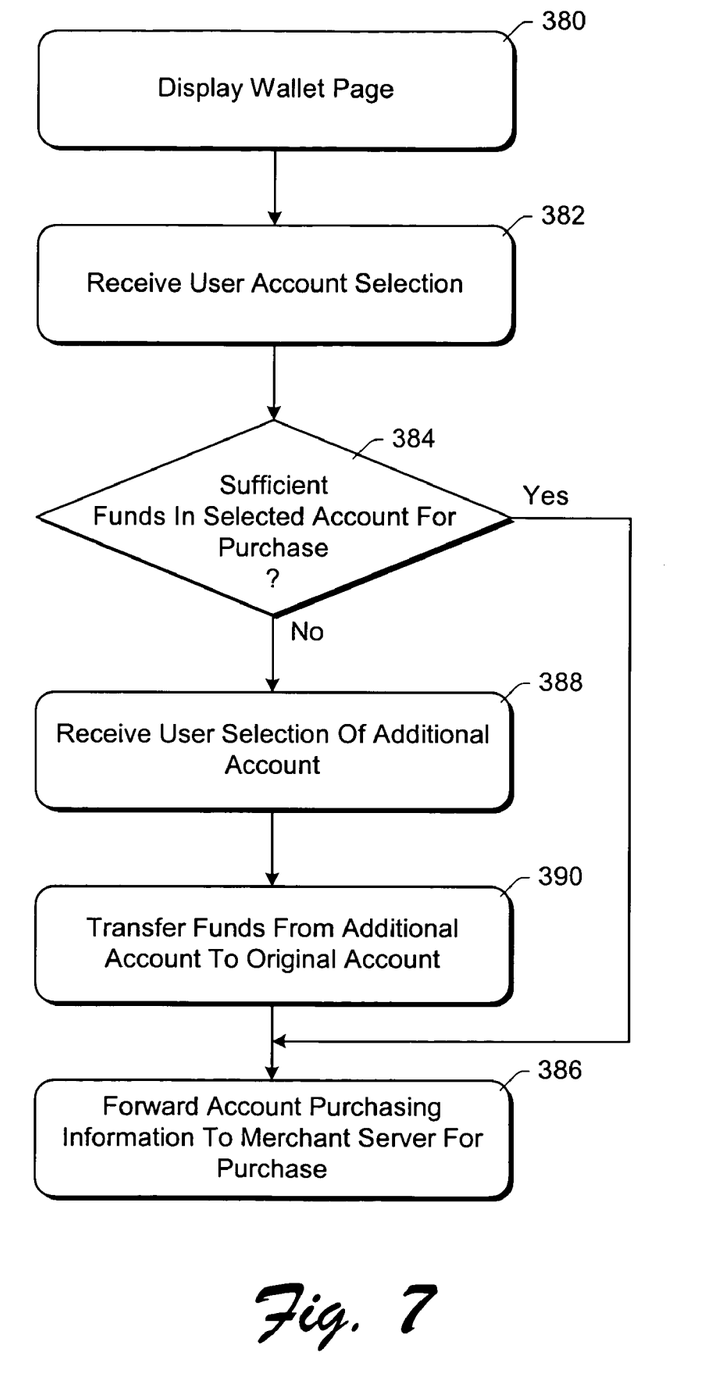
FIG. 7 is a flowchart illustrating an exemplary process for purchasing goods and/or services using an electronic wallet in accordance with certain embodiments of the invention.

FIG. 7 is a flowchart illustrating an exemplary process for purchasing goods and/or services using an electronic wallet in accordance with certain embodiments of the invention. The process of FIG. 7 is implemented by browser 110 and wallet server 106, and may be implemented in software.

Initially, a wallet page is displayed to the user (act 380). The wallet page includes various accounts corresponding to the user that can be used to purchase goods and/or services from merchants. A user-selection of one of these accounts is then received (act 382). A check is then made as to whether there are sufficient funds in the selected account (or credit available, depending on the type of account) to pay for the purchase (act 384). If there are sufficient funds in the account to pay for the purchase, then the purchasing information for the account is forwarded to the merchant for the purchase (act 386).

However, if there are insufficient funds in the selected account to pay for the purchase, then the wallet server allows the user to select an additional account. The wallet server receives the user selection of the additional account and an indication of an amount to be transferred to the originally selected account (act 388). The amount to be transferred can be the difference between the purchase price and the current funds in the account, or alternatively a different amount. The wallet server then transfers the funds from the additional account to the originally selected account (act 390), and forwards the purchasing information for the originally selected account to the merchant for the purchase (act 386). The list of accounts from which this transfer could take place is analogous to the merchant making a purchase, and is subject to the rules (if any) discussed above. Alternatively, acts 388 and 390 may be repeated for multiple additional accounts, allowing funds from multiple additional accounts to be added to the originally selected account. This transferring could be automatic, as outlined above, or alternatively might be driven manually by the user.

Note that the process of FIG. 7 might be implemented only for certain types of accounts (e.g., only for payment accounts). For example, a credit card has a "negative" affect on the end user when funds are validated as being present (it would reserve the funds twice—once by the wallet and once by the merchant). Eventually the check that happens by the wallet (the reserve of funds) would "expire", but the user's credit would be tied up until then. However, a gift certificate payment account might not have the same negative affect, so the double-checking would not pose any problems.

Figure 8:
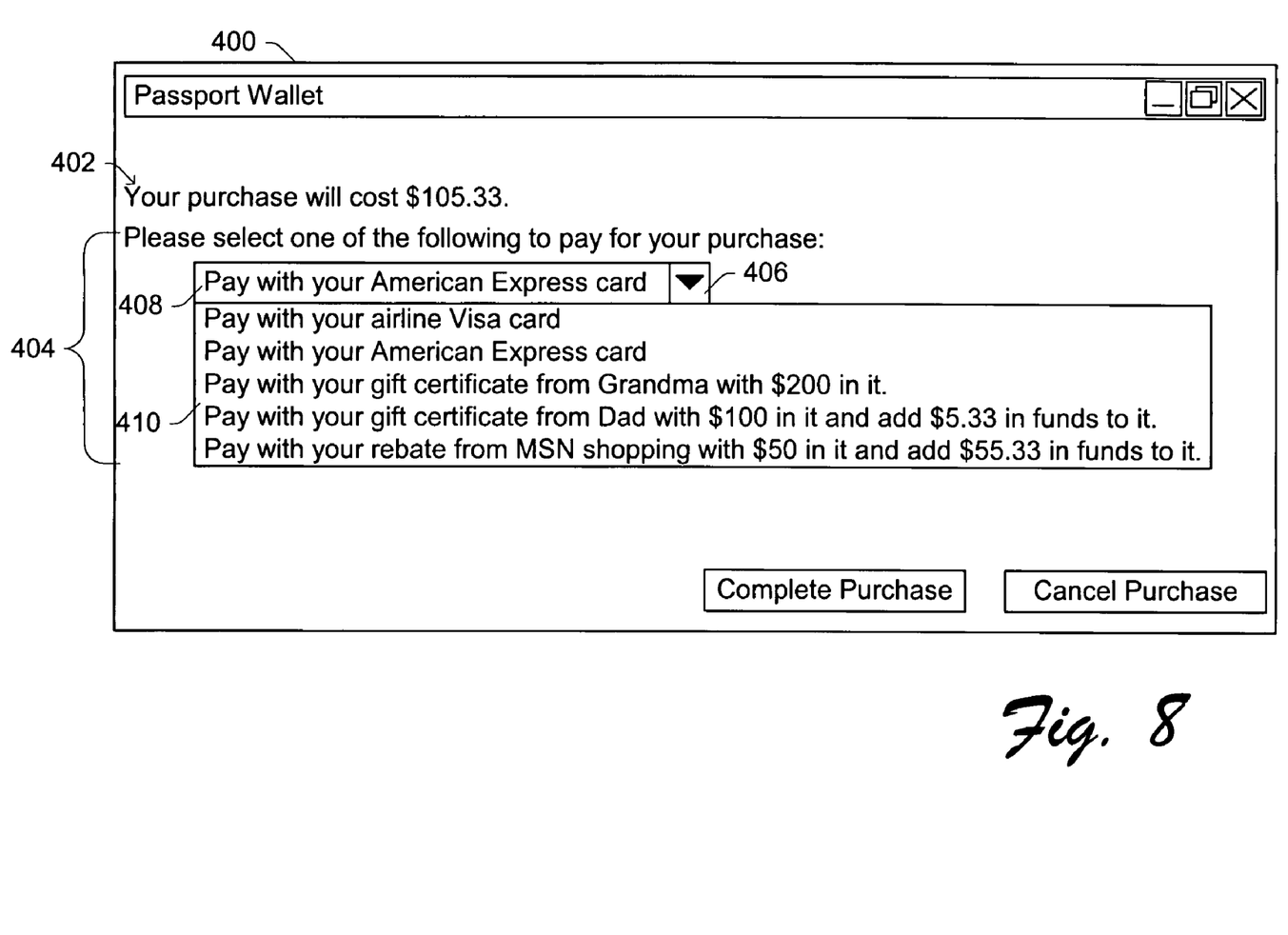
FIGS. 8 and 9 are block diagrams illustrating an exemplary user interface such as may be used in accordance with certain embodiments of the invention
Figure 9:
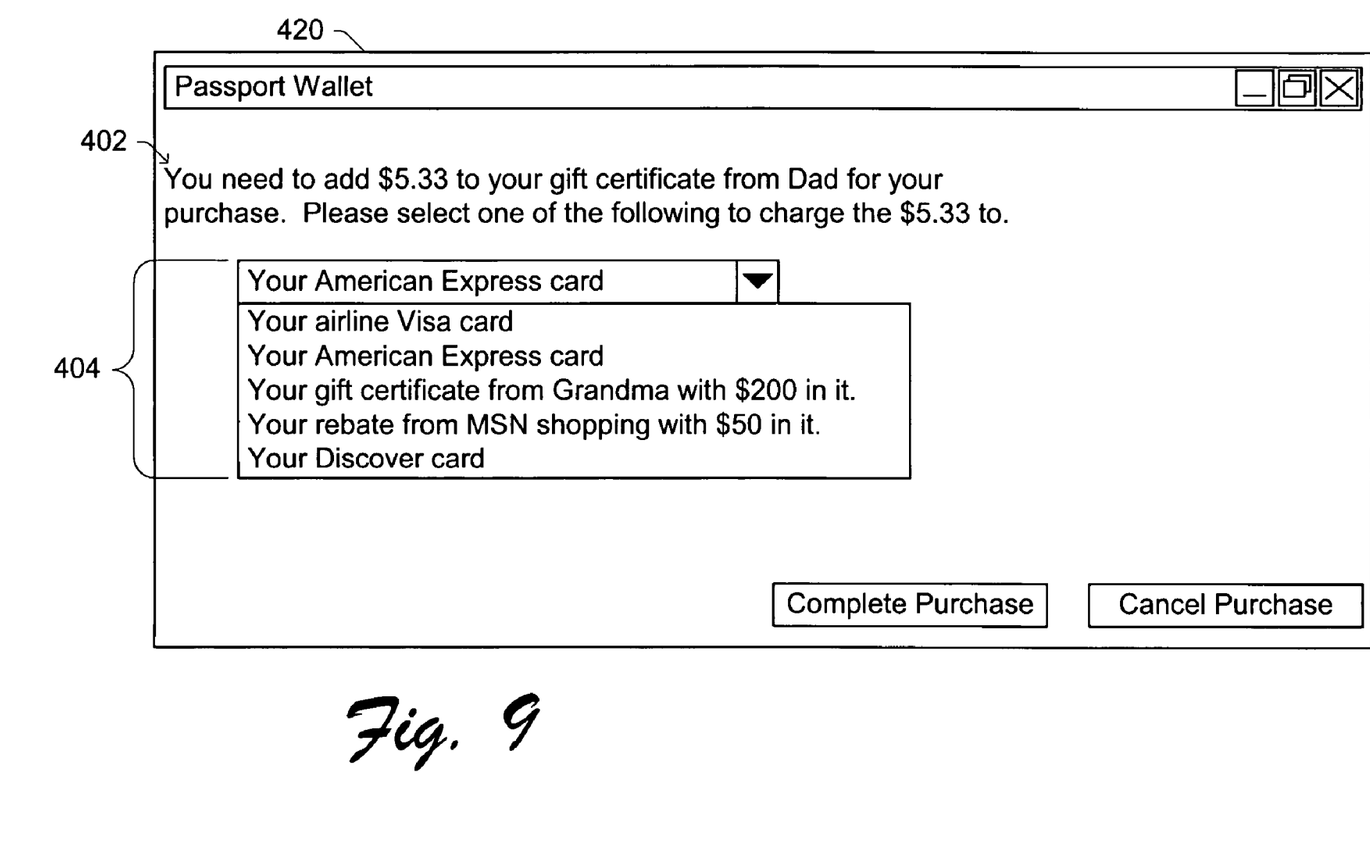

FIGS. 8 and 9 are block diagrams illustrating an exemplary user interface such as may be used in accordance with certain embodiments of the invention. FIGS. 8 and 9 represent an exemplary user interface; alternatively, other user interfaces could be implemented (e.g., using different selection options such as radio buttons or command-line inputs).

Assume that a user has selected products from a merchant web page with a total cost (including any shipping, handling, and taxes) of $105.33. A window 400 is presented to the user that identifies the total cost 402 of his or her purchase as well as a payment selection option 404. User-selection of the drop-down menu icon 406 causes a list of payment options to be presented to the user. The payment options, as discussed above, include those payment accounts that are acceptable to the merchant server or that can be converted by the wallet server to a form acceptable to the merchant. A default account (corresponding to the user's American Express® card) is displayed on line 408 and all payment options displayed in drop-down menu 410.

As can be seen in FIG. 8, the user is made readily aware that he or she has a gift certificate (from Grandma) with sufficient funds for the purchase, or alternatively another gift certificate (from Dad) to which additional funds would have to be added ($5.33) to make the purchase, or a rebate from MSN shopping to which additional funds would have to be added ($55.33) to make the purchase. The user may also have additional payment accounts (not shown) that are restricted from being spent at the merchant, and thus are not displayed to the user.

Assuming the user selects to use the gift certificate from Dad, a new window 420 of FIG. 9 is displayed that identifies the additional amount 422 that needs to be transferred to the gift certificate to make the purchase. Another payment selection option 424 is displayed to the user to allow the user to select one of the available accounts to obtain the additional funds from. Upon user selection of one of these additional accounts, the additional amount ($5.33) is transferred to the gift certificate from Dad payment account so that the purchase can be completed. Note that an additional account (corresponding to the user's Discover® card) is included in options 424. Assuming that the merchant does not accept the Discover® card for purchases, that account was not displayed to the user in options 404 of FIG. 8. However, given that the additional $5.33 in funds will be transferred to the gift certificate from Dad (which can be used at the merchant), the funds can be transferred from the Discover® card to the gift certificate (unbeknownst to the merchant) and thus made useable at the merchant.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable media having stored thereon a plurality of instructions that, when executed by one or more processors, causes the one or more processors to perform acts including:
   receiving, from a merchant server, an indication of a purchase a user is attempting to make;
   identifying a plurality of accounts corresponding to the user;
   selecting a subset of the plurality of accounts to make available to the user, the subset including only those accounts that can be used by the user to make a purchase at the merchant server; and
   presenting the subset of accounts to the user.

2. One or more computer readable media as recited in claim 1, wherein the plurality of accounts include one or more of: credit card accounts, debit card payment accounts, gift certificate payment accounts, rebate payment accounts, reward payment accounts, and cash payment accounts.

3. One or more computer readable media as recited in claim 1, wherein the accounts that can be used to make a purchase at the merchant server are those accounts of a type identified by the merchant server as well as additional accounts of a type that are mapped to an account type identified by the merchant server as being useable.

4. One or more computer readable media as recited in claim 1, wherein the accounts that can be used to make a purchase at the merchant server are those accounts of a type identified by the merchant server as well as additional accounts of a type from which funds can be added to an account of a type identified by the merchant server.

5. One or more computer readable media as recited in claim 3, wherein the plurality of instructions further cause the one or more processors to perform acts including receiving, from the merchant server, the identification of types of accounts as part of the indication of the purchase the user is attempting to make.

6. One or more computer readable media as recited in claim 1, wherein the plurality of instructions further cause the one or more processors to perform acts including:
 receiving a user selection of one of the subset of accounts; and
 forwarding, to the merchant server, payment information corresponding to the selected account.

7. One or more computer readable media as recited in claim 1, wherein the plurality of instructions further cause the one or more processors to perform acts including:
 receiving a user selection of two or more of the subset of accounts;
 allowing the user to combine funds from the selected accounts into a combined account; and
 forwarding, to the merchant server, payment information corresponding to the combined account.

8. One or more computer readable media as recited in claim 7, wherein the plurality of instructions further cause the one or more processors to perform acts including allowing the user to combine finds from one account that is not identified by the merchant as acceptable with another account that is identified by the merchant as acceptable.

9. One or more computer readable media as recited in claim 1, wherein the plurality of instructions further cause the one or more processors to perform acts including:
 receiving a user selection of one of the subset of accounts;
 mapping payment information corresponding to the account to a format that can be used to make a purchase at the merchant server; and
 forwarding, to the merchant server, the mapped payment information.

10. One or more computer readable media as recited in claim 1, wherein the plurality of accounts are identified in an electronic wallet, and wherein the plurality of instructions further cause the one or more processors to perform acts including:
 receiving, from the merchant server, a request for information not included in the electronic wallet;
 querying the user for the information;
 receiving a response to the query;
 returning the response to the merchant server as the requested information.

11. A method comprising:
 presenting a plurality of accounts of different types to a user, the plurality of accounts being included in an electronic wallet; and
 allowing the user to transfer value from one of the plurality of accounts to another of the plurality of accounts.

12. A method as recited in claim 11, further comprising storing the plurality of accounts in the electronic wallet on a remote server.

13. A method as recited in claim 11, wherein the different types of accounts include two or more of: debit card payment accounts, gift certificate payment accounts, rebate payment accounts, reward payment accounts, allowance payment accounts, and cash payment accounts.

14. A method as recited in claim 11, wherein the allowing comprises allowing the user to transfer value from one of the plurality of accounts to another of the plurality of accounts while in the process of making an on-line purchase.

15. A method as recited in claim 14, wherein the allowing further comprises allowing the user to transfer value from an account that is not accepted by a merchant at which the on-line purchase is being made to an account that is accepted by the merchant.

16. One or more computer-readable memories containing a computer program that is executable by a processor to perform the method recited in claim 11.

17. A system comprising;
 a wallet server to store a plurality of payment accounts for a user; and
 a user interface component, coupled to the wallet server, to display the plurality of payment accounts and to allow manipulation of the payment accounts including transferring value from one payment account to another.

18. A system as recited in claim 17, wherein the user interface component comprises a web page.

19. A method comprising:
 receiving a request from a user to make a purchase using a particular type of fund included in an electronic wallet of the user;
 converting payment information corresponding to the particular fund to a credit card format; and
 communicating the converted payment information to a merchant for the purchase.

20. A method as recited in claim 19, wherein the particular type of fund comprises a gift certificate.

21. A method as recited in claim 19, wherein the particular type of fund comprises a rebate.

22. A method as recited in claim 19, wherein the converting comprises converting the payment information to the credit card format without the user's knowledge.

23. A method as recited in claim 19, wherein the converting comprises converting the payment information to a Visa® credit card format.

24. A method as recited in claim 19, wherein the communicating comprises communicating the converted payment information to the merchant without any indication of the conversion from the particular type of fund.

25. One or more computer-readable memories containing a computer program that is executable by a processor to perform the method recited in claim 19.

26. A method comprising:
 maintaining, in an electronic wallet, a plurality of different types of payment accounts for a user;
 allowing the user to transfer payment information stored in the payment accounts to merchants to make purchases; and
 allowing the user to transfer funds between different ones of the plurality of different types of payment accounts.

27. A method as recited in claim 26, wherein the types of payment accounts include one or more of: debit cards, gift certificates, rebates, allowances, and cash.

28. A method as recited in claim 26, wherein the maintaining comprises maintaining the plurality of different types of payment accounts at a remote server.

29. A method as recited in claim 26, further comprising allowing additional funds to be added to a payment account.

30. A method as recited in claim 29, wherein allowing additional funds to be added to the payment account comprises allowing additional finds to be added to the payment account by the user.

31. A method as recited in claim 29, further comprising:
   receiving a request from a merchant for information that is not included in the electronic wallet;
   obtaining the requested information from the user;
   returning the requested information to the merchant.

32. One or more computer-readable memories containing a computer program that is executable by a processor to perform the method recited in claim 26.

33. One or more computer readable media having stored thereon a plurality of instructions that, when executed by one or more processors, causes the one or more processors to perform acts including:
   maintaining a gift certificate account including payment information corresponding to the gift certificate account;
   presenting, to the user, the gift certificate account as a gift certificate; and
   presenting, to a merchant, the gift certificate account as a credit card.

\* \* \* \* \*